United States Patent
Wan et al.

(10) Patent No.: US 12,034,636 B2
(45) Date of Patent: Jul. 9, 2024

(54) PACKET PROCESSING METHOD AND NETWORK APPARATUS

(71) Applicant: HUAWEI TECHNOLOGIES CO., LTD., Guangdong (CN)

(72) Inventors: Quangao Wan, Dongguan (CN); Taixu Tian, Dongguan (CN); Huadong Xu, Dongguan (CN); Zhongzhen Wang, Beijing (CN); Jiakui Song, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/386,657

(22) Filed: Jul. 28, 2021

(65) Prior Publication Data

US 2021/0359939 A1 Nov. 18, 2021

Related U.S. Application Data

(63) Continuation of application No. PCT/CN2020/078610, filed on Mar. 10, 2020.

(30) Foreign Application Priority Data

Apr. 4, 2019 (CN) .......................... 201910272143.0

(51) Int. Cl.
*H04L 12/741* (2013.01)
*H04L 12/721* (2013.01)
(Continued)

(52) U.S. Cl.
CPC .............. *H04L 45/74* (2013.01); *H04L 45/20* (2013.01); *H04L 45/38* (2013.01)

(58) Field of Classification Search
CPC ......... H04L 45/74; H04L 45/20; H04L 45/38; H04L 47/2441; H04L 43/0829
See application file for complete search history.

(56) References Cited

U.S. PATENT DOCUMENTS 9,456,378 B2 * 9/2016 Zhu .................. H04W 28/0289
2002/0181400 A1 * 12/2002 Zheng .................... H04L 69/22
370/235
(Continued)

FOREIGN PATENT DOCUMENTS

CN 101771595 A 7/2010
CN 102271079 A 12/2011
(Continued)

OTHER PUBLICATIONS

K. Kompella et al, The Use of Entropy Labels in MPLS Forwarding draft-ietf-mpls-entropy-label-06, Network Working Group, Internet-Draft, Sep. 6, 2012, 23 pages.

(Continued)

*Primary Examiner* — Hoang-Chuong Q Vu

(57) ABSTRACT

This application provides a packet processing method, including: receiving, by a current network node, a first packet; determining, by the current network node, a flow identification corresponding to the first packet, where the first packet does not include the flow identification; obtaining, by the current network node based on the first packet and the flow identification, a second packet, where the second packet includes the flow identification and an IOAM header, and in the second packet, the flow identification is located before the IOAM header; and sending, by the current network node, the second packet to a next network node. This resolves a problem that as a quantity of passed IOAM nodes increases, traffic classification performed by a subsequent node consumes a longer delay, thereby deteriorating forwarding performance.

14 Claims, 7 Drawing Sheets

(51) Int. Cl.
  *H04L 12/733* (2013.01)
  *H04L 45/00* (2022.01)
  *H04L 45/74* (2022.01)

(56) References Cited

U.S. PATENT DOCUMENTS

| | | | | |
|---|---|---|---|---|
| 2003/0112766 | A1* | 6/2003 | Riedel | H04L 47/822 |
| | | | | 370/252 |
| 2005/0068981 | A1* | 3/2005 | Park | H04L 69/16 |
| | | | | 370/466 |
| 2008/0159288 | A1* | 7/2008 | Nagarajan | H04L 45/38 |
| | | | | 370/392 |
| 2012/0243544 | A1* | 9/2012 | Keesara | H04L 12/4633 |
| | | | | 370/395.53 |
| 2015/0373162 | A1* | 12/2015 | Mosko | H04L 45/40 |
| | | | | 370/392 |
| 2016/0315921 | A1* | 10/2016 | Dara | H04L 69/166 |
| 2016/0337905 | A1* | 11/2016 | Zhang | H04W 28/065 |
| 2017/0041230 | A1 | 2/2017 | Huang et al. | |
| 2017/0250907 | A1* | 8/2017 | Pignataro | H04L 43/04 |
| 2018/0131602 | A1* | 5/2018 | Civanlar | H04L 45/745 |
| 2018/0176134 | A1* | 6/2018 | Pignataro | H04L 67/10 |
| 2019/0037391 | A1 | 1/2019 | Pignataro et al. | |
| 2019/0149449 | A1* | 5/2019 | Morris | H04L 45/22 |
| | | | | 709/245 |
| 2019/0182103 | A1* | 6/2019 | Pignataro | H04L 41/16 |
| 2019/0222515 | A1* | 7/2019 | Pignataro | H04L 43/10 |
| 2019/0288938 | A1* | 9/2019 | Song | H04L 43/106 |
| 2020/0084143 | A1* | 3/2020 | Gandhi | H04L 45/24 |
| 2020/0154304 | A1* | 5/2020 | Cho | H04W 28/0268 |
| 2022/0329523 | A1* | 10/2022 | Pignataro | H04L 43/04 |
| 2024/0015103 | A1* | 1/2024 | Bonica | H04L 43/0894 |

FOREIGN PATENT DOCUMENTS

| | | |
|---|---|---|
| CN | 103166866 A | 6/2013 |
| CN | 104378245 A | 2/2015 |
| CN | 108737124 A | 11/2018 |
| CN | 108737127 A | 11/2018 |
| CN | 108737128 A | 11/2018 |
| CN | 108737269 A | 11/2018 |
| CN | 108965204 A | 12/2018 |
| CN | 109347671 A | 2/2019 |
| CN | 109561021 A | 4/2019 |
| CN | 109743340 A | 5/2019 |

OTHER PUBLICATIONS

Communication pursuant to Article 94(3) EPC dated Sep. 22, 2022 issued for European Application No. 20 782 786.6 (5 pages).
F. Brockners et al, Data Fields for In-situ OAM draft-ietf-ippm-ioam-data-05, ippm Internet-Draft, Mar. 10, 2019, 42 pages, XP015131820.
Communication under Rule 71(3) EPC dated May 23, 2023 issued for European Application No. 20 782 786.6 (43 pages).
J. Halpern et al, Service Function Chaining (SFC) Architecture, RFC 7665, Internet Engineering Task Force (IETF), Oct. 2015, 32 pages.
S. Deering et al, Internet Protocol, Version 6 (IPv6) Specification, RFC 2460, Network Working Group, Request for Comments: 2460, Obsoletes: 1883, Category: Standards Track, Dec. 1998, 39 pages.
F. Brockners et al, Encapsulations for In-situ OAM Data; draft-brockners-inband-oam-transport-03, ippm, Internet-Draft, Mar. 12, 2017, 21 pages.
F. Brockners et al, Data Formats for In-situ OAM; draft-brockners-inband-oam-data-02, Network Working Group, Internet-Draft , Oct. 30, 2016, 22 pages.
C. Filsfils et al, BGP-Prefix Segment in large-scale data centers; draft-ietf-spring-segment-routing-msdc-10, Network Working Group, Internet-Draft, Oct. 15, 2018, 24 pages.
Office Action issued in CN 201910272143.0, dated May 22, 2019, 5 pages.
Notice of Allowance issued in CN 201910272143.0, dated Jul. 3, 2019, 4 pages.
International Search Report and Written Opinion issued in PCT/CN2020/078610, dated May 28, 2020, 10 pages.

\* cited by examiner

PACKET PROCESSING METHOD AND NETWORK APPARATUS

CROSS-REFERENCE TO RELATED APPLICATIONS

This application is a continuation application of International Application No. PCT/CN2020/078610, filed on Mar. 10, 2020, which claims priority to Chinese Patent Application No. 201910272143.0, filed on Apr. 4, 2019. The disclosures of the aforementioned applications are hereby incorporated by reference in their entireties.

TECHNICAL FIELD

This application relates to the field of data communications, and specifically, to a packet processing method and a network apparatus.

BACKGROUND

An in-situ operations, administration and maintenance (IOAM) node on a packet transmission path may perform IOAM encapsulation on a service data packet, that is, insert an IOAM header into the packet. A network node needs to perform deep packet parsing on an IOAM packet, so as to perform traffic classification on the packet. In the foregoing solution, overheads of the network node are relatively high, and forwarding performance is relatively low.

SUMMARY

Embodiments of this application provide a packet processing method and a network apparatus, to reduce overheads of a network node and improve forwarding performance.

According to a first aspect, a packet processing method is provided, including: receiving, by a current network node, a first packet, where the first packet includes an internet protocol IP packet payload and a specific header; determining, by the current network node, a flow identification corresponding to the first packet, where the first packet does not include the flow identification, a feature of the first packet corresponds to the flow identification, and the feature of the first packet is located in a header of the first packet; obtaining, by the current network node based on the first packet and the flow identification, a second packet, where the second packet includes the flow identification and an IOAM header, and in the second packet, the flow identification is located before the IOAM header; and sending, by the current network node, the second packet to a next network node.

The foregoing technical solution resolves a problem that as a quantity of passed IOAM nodes increases, a packet detection depth of a subsequent node increases in order to perform traffic classification, thereby consuming a longer delay and deteriorating forwarding performance.

With reference to the first aspect, in a possible implementation, the flow identification is located in a hop-by-hop options header when the second packet is an internet protocol version 6 (IPv6) packet.

The flow identification is added to the Hop-by-Hop Options header of the packet. This does not affect a current packet transmission technology.

With reference to the first aspect, in a possible implementation, the flow identification corresponds to a field in the header of the first packet, and a size of the flow identification is less than a size of the field in the header of the first packet.

By using a flow identification with a relatively small size, an octets-left used by the subsequent node to parse a packet for traffic classification is reduced, and a delay is reduced.

According to a second aspect, a packet processing method is provided, including: receiving, by a network node, an inband operations, administration and maintenance (IOAM) packet, where the IOAM packet includes a flow identification, the flow identification is located before an IOAM header of the IOAM packet, the flow identification corresponds to a feature of the IOAM packet, the feature of the IOAM packet is located in a header of the IOAM packet, and the header of the IOAM packet and the IOAM header are not a same header; and processing, by the network node based on the flow identification, the IOAM packet.

The foregoing technical solution resolves a problem that as a quantity of passed IOAM nodes increases, a packet detection depth of a subsequent node increases in order to perform traffic classification, thereby consuming a longer delay and deteriorating forwarding performance.

With reference to the second aspect, in a possible implementation, the flow identification is located in a hop-by-hop options header when the IOAM packet is an internet protocol version 6 (IPv6) packet.

The flow identification is added to the Hop-by-Hop Options header of the packet. This does not affect a current packet transmission technology.

With reference to the second aspect, in a possible implementation, the flow identification corresponds to a field in the header of the IOAM packet, and a size of the flow identification is less than a size of the field in the header of the IOAM packet.

By using a flow identification of a relatively small size, an octets-left used by the subsequent node to parse a packet for traffic classification is reduced, and a delay is reduced.

With reference to the second aspect, in a possible implementation, the processing, based on the flow identification, the IOAM packet includes: searching, based on the flow identification, a traffic classification table to obtain a traffic behavior, where the traffic classification table records the flow identification and the traffic behavior; and processing, based on the traffic behavior, the IOAM packet.

With reference to the second aspect, in a possible implementation, the traffic classification table is stored in a random access memory RAM.

A subsequent network node does not depend on creation of a complex traffic profile, and does not depend on and repeats a same packet feature-based matching process. Packets in different flows can be processed differently by using only the traffic classification table stored in the random access memory RAM. This reduces a requirement for an ACL table and lowers costs.

According to a third aspect, a packet processing network device is provided, including: a receiving unit, configured to receive a first packet; a determining unit, configured to determine a flow identification corresponding to the first packet, where the first packet does not include the flow identification, a feature of the first packet corresponds to the flow identification, and the feature of the first packet is located in a header of the first packet; an obtaining unit, configured to obtain, based on the first packet and the flow identification, a second packet, where the second packet includes the flow identification and an IOAM header, and in the second packet, the flow identification is located before the IOAM header; and a sending unit, configured to send the second packet to a next network node.

With reference to the third aspect, in a possible implementation, the flow identification is located in a hop-by-hop options header when the IP header is an internet protocol version 6 (IPv6) header.

With reference to the third aspect, in a possible implementation, the flow identification corresponds to a field in the header of the first packet, and a size of the flow identification is less than a size of the field in the header of the first packet.

According to a fourth aspect, a packet processing network device is provided, including: a receiving unit, configured to receive an inband operations, administration and maintenance (IOAM) packet, where the IOAM packet includes a flow identification, the flow identification is located before an IOAM header of the IOAM packet, the flow identification corresponds to a feature of the IOAM packet, the feature of the IOAM packet is located in a header of the IOAM packet, and the header of the IOAM packet and the IOAM header are not a same header; and a processing unit, configured to process, based on the flow identification, the IOAM packet.

With reference to the fourth aspect, in a possible implementation, the flow identification is located in a hop-by-hop options header when the IP header is an internet protocol version 6 (IPv6) header.

With reference to the fourth aspect, in a possible implementation, the flow identification corresponds to a field in the header of the IOAM packet, and a size of the flow identification is less than a size of the field in the header of the IOAM packet.

With reference to the fourth aspect, in a possible implementation, the processing unit is further configured to: search, based on the flow identification, a traffic classification table to obtain a traffic behavior, where the traffic classification table is a linear table, and the linear table records the flow identification and the traffic behavior; and process, based on the traffic behavior, the IOAM packet.

With reference to the fourth aspect, in a possible implementation, the traffic classification table is stored in a random access memory RAM.

According to a fifth aspect, a communications apparatus is provided, including at least one processor and a communications interface. The communications interface is used by the communications apparatus to exchange information with another communications apparatus, and when program instructions are executed by the at least one processor, the communications apparatus is enabled to perform the foregoing method.

According to a sixth aspect, a computer program storage medium is provided. The computer program storage medium has program instructions, and when the program instructions are executed, the foregoing method is performed.

According to a seventh aspect, a chip is provided. The chip system includes at least one processor, and when program instructions are executed by the at least one processor, the foregoing method is performed.

DESCRIPTION OF EMBODIMENTS

Figure 1:
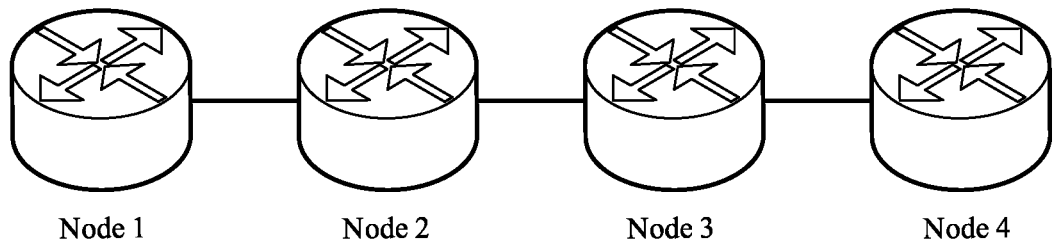
FIG. 1 is a schematic diagram of an application scenario according to an embodiment of this application.

A packet usually passes through many network nodes during transmission on a network. FIG. 1 is used as an example. A packet passes through a network node 1 to a network node 4 in sequence. The packet may be an internet protocol (IP) packet, for example, may be an internet protocol version 4 (IPv4) packet, or may be an internet protocol version 6 (IPv6) packet, or may be a packet of another type. The network node may be a router or a switch.

In-situ operations, administration and maintenance (IOAM) is an operations, administration and maintenance (OAM) technology for data communications networks, and is also referred to as in-band OAM. A feature of the IOAM is as follows: IOAM data content is encapsulated into a service data packet and transmitted on the network as a part of the service data packet. The IOAM data content may also be referred to as IOAM information.

The network node 1 to the network node 4 in FIG. 1 may be IOAM transmission nodes. The IOAM transmission node is a node that needs to process the IOAM data content on a transmission path of the service data packet. As a quantity of IOAM nodes that the packet passes through increases, a forwarding delay increases and forwarding performance deteriorates.

The IOAM node may add the IOAM information to the packet. The IOAM information may be carried in an IOAM header. Specifically, the IOAM node may insert the IOAM header into the packet, or set a value of the IOAM header in the packet. In this application, a manner of inserting the IOAM header into the packet is referred to as an incremental mode, and a manner of setting a value of the IOAM header in the packet is referred to as a pre-allocation mode. For example, an IOAM ingress node may determine IOAM encapsulation of the IOAM ingress node based on configuration information of an IOAM transit node and an IOAM egress node. The IOAM configuration information of the IOAM transit node may include, for example, a trace type of the node. The trace type may be used to indicate whether the node uses the pre-allocation mode or the incremental mode to insert node information. The IOAM configuration information may further include a quantity of bytes that need to be occupied by the node information, and the like. If the IOAM transit node inserts the node information by using the incremental mode, the node performs the IOAM encapsulation and inserts an IOAM header corresponding to the node into the service data packet. If the IOAM transit node inserts the node information by using the pre-allocation mode, the node inserts the node information at a pre-allocated position of a received packet. The IOAM ingress node may determine, based on the configuration information of the IOAM transit node and the IOAM egress node, whether to pre-allocate an IOAM field.

For example, the IOAM ingress node may configure the IOAM transit node and the IOAM egress node, for example, configure a trace type of the IOAM transit node and the IOAM egress node.

The IOAM node on a packet transmission path may perform the IOAM encapsulation on the packet. The IOAM encapsulation is to insert the IOAM header into the service data packet. Through the IOAM encapsulation, IOAM can implement some functions that cannot be implemented by out-of-band OAM. For example, detecting network nodes that the service data packet actually passes through, verifying whether the transmission path of the service data packet is as expected, and adding sequence number information to the service data packet to detect a packet loss, disorder, and the like.

The IOAM ingress node and the IOAM transit node may insert the IOAM header into a packet of a specified service flow. The IOAM header includes information such as a timestamp, a node identification (ID), an interface ID, and a sequence number. The IOAM ingress node may also be referred to as an IOAM head node.

The IOAM egress node may insert the information such as the timestamp, the node identification (ID), the interface ID, and the sequence number into the packet of the specified service flow, or may not insert the information into the packet. After decapsulating the packet, the IOAM egress node may send collected data to an analyzer. For example, the IOAM egress node may send all collected data to the analyzer, or may send collected data in a specified periodicity to the analyzer. The collected data may include the information in the IOAM header inserted into the packet by the IOAM ingress node and the IOAM transit node, and may further include the information such as the timestamp, the node identification (ID), the interface ID, and the sequence number of the packet of the specified service flow corresponding to the IOAM egress node. The IOAM egress node may also be referred to as an IOAM tail node. The IOAM egress node decapsulates the packet, in other words, removes the IOAM header from the packet.

The analyzer, also referred to as a collection analyzer, can analyze packets in a statistical periodicity to obtain information about each node and compare a sequence number of a transit end with a sequence number of a receive end. The difference is a quantity of lost packets. A specific packet loss location can be calculated based on sequence numbers of all nodes reported by the IOAM egress node.

The IOAM packet includes the IOAM header. The IOAM packet may pass through an IOAM network node during transmission. The IOAM packet may be specifically an IP packet. The IP packet includes an IP header and an IP packet payload. The IOAM header of the IOAM packet may be located after the IP header of the packet. Specifically, the IOAM header may be located in the IP packet payload of the packet. The IOAM header may include the IOAM information.

Figure 2:
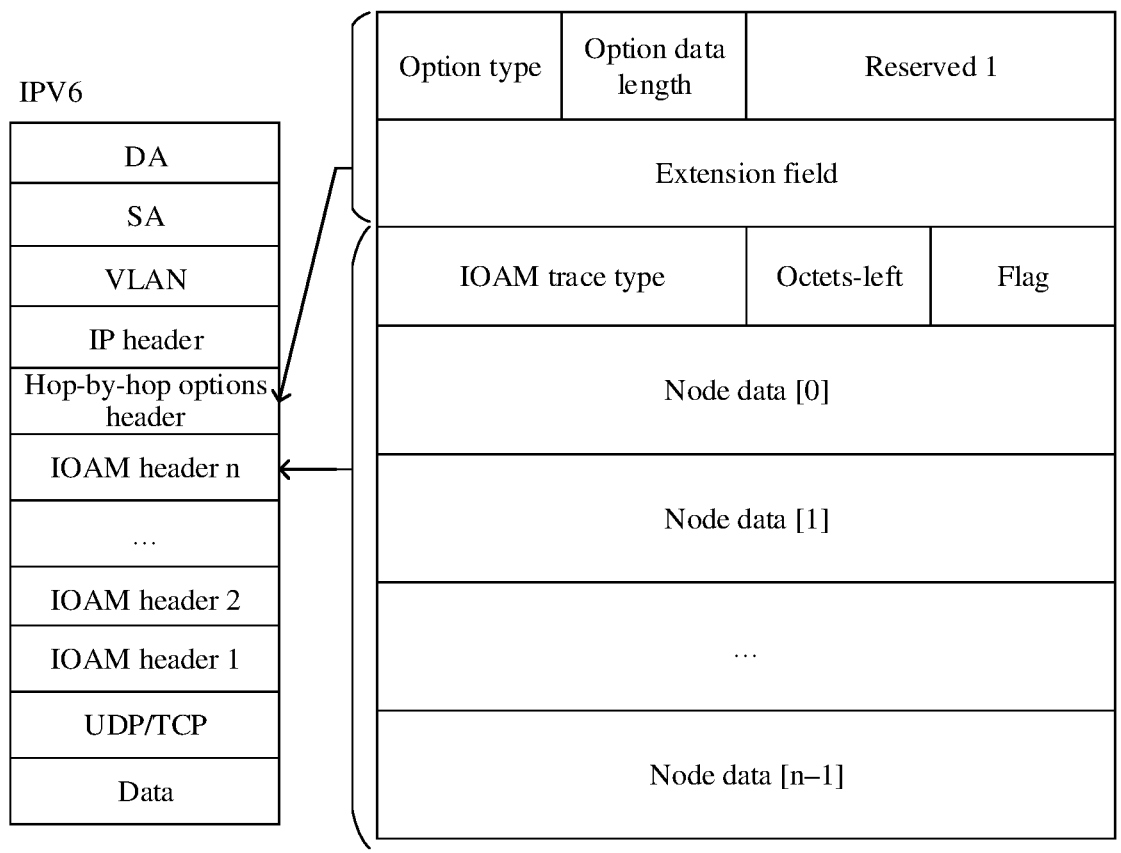
FIG. 2 is a schematic diagram of a format of an IOAM packet.

An IPv6 packet is used as an example. FIG. 2 describes a format of an IOAM packet. After passing through the IOAM node, the IOAM packet may include: a destination address (DA), a source address (SA), a virtual local area network (VLAN) protocol, an Ethernet type (EthType), an IPv6 header, an IOAM header, a transmission control protocol (TCP)/user datagram protocol (UDP), and data. The IPv6 header may be adjacent to a hop-by-hop options header. For the Hop-by-Hop Options header, refer to RFC 2460 released by the internet engineering task force (IETF). The Hop-by-Hop Options header may include an option type, an option type length, a reserved field, and the like. The reserved field may also be referred to as a default field. The Hop-by-Hop Options header may further include an extension field. Based on an option type value in the Hop-by-Hop Options header, an extension header after the IPv6 header may be determined as the IOAM header. The IP packet payload in the packet may include the data. The IP packet payload may further include an upper layer header, for example, a TCP header or a UDP header. In the packet, the IP packet payload is located after the IP header. The IP header may be adjacent to the IP packet payload, and one or more extension headers may exist between the IP header and the IP packet payload. For example, the Hop-by-Hop Options header may exist between the IP header and the IP packet payload. The IOAM header may be located in the extension field of the Hop-by-Hop Options header. A field before the data in the packet may be referred to as a header of the packet.

For example, the IOAM header may include node data. The node data may also be referred to as IOAM information. The IOAM header may be inserted by an IOAM ingress node, an IOAM transit node, or an IOAM egress node.

For example, the IOAM header may include an IOAM trace type, an octets-left, a flag, and n pieces of node data. The IOAM trace type may be used to identify information specifically included in the IOAM header, that is, identify content of the node data. The IOAM header may be inserted by the IOAM ingress node.

A trace type may have 16 bits, and may include: a hop limit (similar to a time to live (TTL)) and an ID of a passed node, an inbound interface ID and an outbound interface ID, a second timestamp of a node, a nanosecond timestamp of a node, a forwarding delay of a node, node application-related data used for upstream statistics, a queue depth of a node, any data, and a hop limit (similar to a TTL) and an ID of a passed node (in wide format), an inbound interface ID and an outbound interface ID (in wide format), node application-related data used for downstream statistics, and the like. Currently, five bits of the trace type are reserved.

To collect statistics on packets, each network node needs to identify a service flow. Flow identification is also referred to as traffic classification. An access control list (ACL) is mainly used to implement a flow identification function. The network node usually uses the ACL to identify the service flow.

The network node may filter a packet that passes through the network node. To filter a packet, a series of matching rules need to be configured for the network node to identify a packet that needs to be filtered. After identifying a specific packet, a corresponding packet can be permitted or denied to pass through based on a preset policy. The network node usually uses the access control list (ACL) to implement the foregoing functions. The ACL may be an IPv4 ACL, an IPv6 ACL, a user ACL, or the like.

The ACL classifies packets based on a series of matching conditions. These conditions may be one or more features of the packets. The feature of the packet may include, for example, a source media access control (SMAC) address, a destination media access control (DMAC) address, a service provider virtual local area network (SVLAN), a customer virtual local area network (CVLAN), a priority (PRI), a source IP address, and a destination IP address of the packet.

Based on application purposes, ACLs may be classified into basic ACLs, advanced ACLs, layer 2 ACLs, and user-defined ACLs. The basic ACL can define rules based on only layer 3 information. The layer 3 information may include, for example, a source IP address and a destination IP address. The advanced ACL can define rules based on layer 3 and layer 4 information of a data packet. The layer 4 information may include, for example, a protocol type and a protocol feature, for example, information of the UDP or TCP header, of an IP bearer. The layer 2 ACL defines rules based on layer 2 information. The layer 2 information may include a source MAC address, a destination MAC address, a VLAN priority, a layer 2 protocol type, and the like. The user-defined ACL specifies, based on a header of the data packet, a byte from which an "AND" operation is performed, and compares a character string extracted from the packet with a user-defined character string to find a matched packet. ACLs can be differentiated based on ACL numbers. A layer 2 header of the packet may include the layer 2 information, a layer 3 header of the packet may include the layer 3 information, and a layer 4 header of the packet may include the layer 4 information.

The data packet matching rules defined by the ACLs can be referenced by another function that needs to differentiate traffic, for example, a definition of traffic classification rules in QoS. Based on the ACL, a traffic classifier classifies packets based on the packet features (also referred to as traffic features).

The traffic classification may include simple traffic classification and complex traffic classification. Different types of traffic classifications are used to match different features. The complex traffic classification is used as an example. Different types of ACLs may be used to classify packets. A feature used to match a classification may be a 2-tuple (a source IP address and a destination IP address), a 3-tuple (a source IP address, a destination IP address, and a protocol number), a 4-tuple (a source IP address, a destination IP address, a source port, and a destination port), a 5-tuple (a source IP address, a source port number, a protocol number, a destination IP address, and a destination port number), or the like of a packet.

Based on the traffic classification of the packet, the network node can collect statistics on the traffic to obtain a packet sequence number. For example, a statistics ID can be obtained by matching the ACL to collect statistics on packets. A current network node may write the packet sequence number into the IOAM header of the packet. The network node may also perform a corresponding traffic behavior (or referred to as a traffic action) based on a classifier result. For example, operations such as priority mapping, marking and coloring, and committed access rate (CAR) statistics may be performed on the packet.

The following uses the complex traffic classification as an example to simply describe a traffic classification process on an IOAM node.

Figure 3:
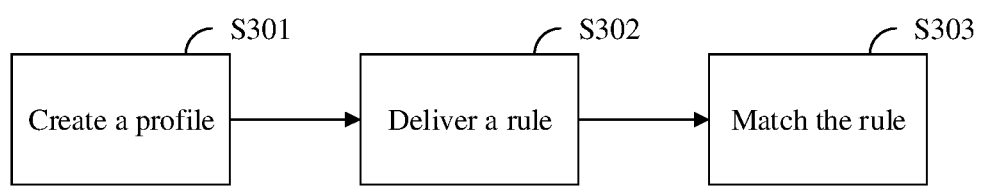
FIG. 3 is a schematic flowchart of a traffic classification process of a conventional network node.

As shown in FIG. 3, a complex traffic classification process generally includes the following steps: create a profile (S301), deliver a rule (S302), and match the rule (S303).

In step S301, a network node may create a traffic profile for a specific flow. The traffic profile may be used to record the matching rule of traffic classification and a corresponding traffic behavior. The traffic profile may include a traffic policy profile (or referred to as a traffic behavior profile) and a traffic classification profile.

In step S302, the network node may deliver and store the created traffic profile in a ternary content addressable memory (TCAM) table of the network node.

In step S303, after a packet of the flow enters an interface of the network node, the network node may perform matching according to the rule by using the TCAM table.

After the matching succeeds, the network node may collect statistics on the packet based on a matching result, and process the packet. For example, the network node may collect statistics on the flow, and write a sequence number into an IOAM header. The sequence number may be used to calculate a packet loss and a packet loss location. The network node may also process the packet based on a corresponding traffic action, for example, perform a corresponding traffic behavior.

An IOAM egress node may report sequence number information to a collector. The collector may calculate the packet loss or the packet loss location based on a sequence number of each IOAM node.

In a conventional traffic classification process, each network node that performs traffic classification on a packet needs to create a complex profile, and repeats a same packet feature-based matching process.

In some cases, some network nodes can perform traffic classification on packets only after obtaining information following the IOAM header. If a forwarding path is relatively long and a relatively large quantity of IOAM nodes are involved, deep packet parsing is required. This consumes a longer delay and deteriorates forwarding performance. In addition, each network node needs to occupy ACL resources. This consumes a large quantity of hardware resources and wastes system resources.

For example, for an IPv6 packet, the network node may need to parse a UDP/TCP header of the packet to obtain a port number. The UDP/TCP header is located in an IP packet payload. As a quantity of passed IOAM nodes increases, traffic classification performed by matching and searching ACL consumes a longer delay, thereby deteriorating forwarding performance.

To resolve the foregoing problem, this application provides a packet processing method. The following describes this embodiment of this application in detail with reference to FIG. 4.

Figure 4:
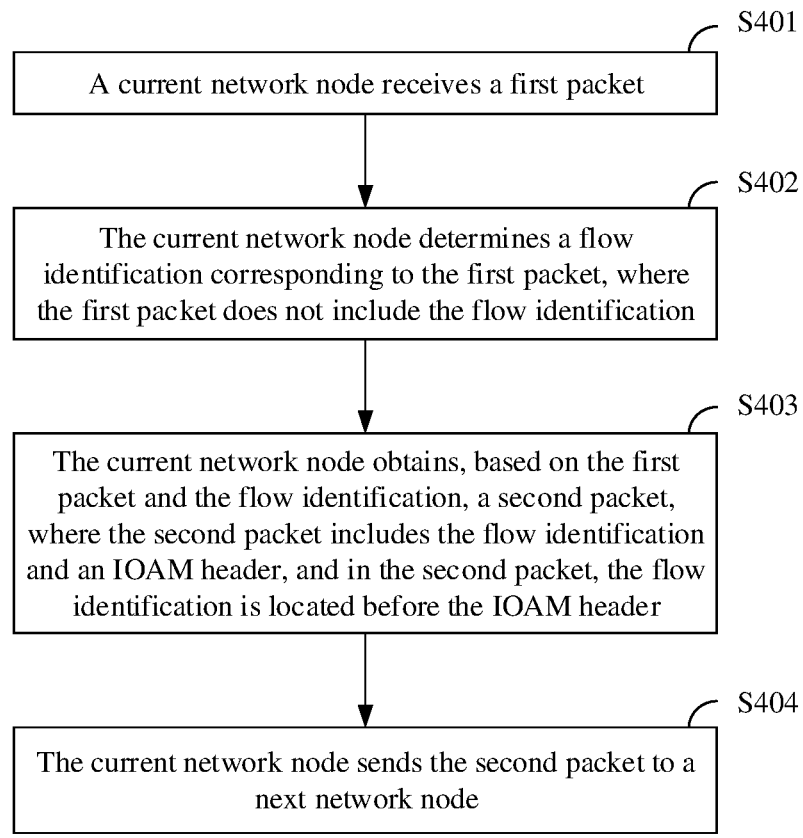
FIG. 4 is a schematic flowchart of a packet processing method according to an embodiment of this application.

FIG. 4 is a schematic flowchart of a packet processing method according to this application. The method in FIG. 4 includes step S401 to step S404.

In step S401, a current network node receives a first packet.

The first packet may include an internet protocol IP packet payload and a specific header. In the first packet, the specific header is located before the IP packet payload.

In this application, the specific header is a header before the IP packet payload in the first packet. The specific header may be an IP header or a lower layer header. A layer at which the lower layer header is located is lower than a layer at which the IP header is located. The IP header is located at a third layer. For example, the lower layer header may be located at a second layer or a 2.5th layer.

For example, the specific header may include a layer 2 header of the first packet, and the specific header may also include a layer 2.5 header of the first packet. The layer 2.5 header may also be referred to as a multiprotocol label switching (MPLS) header.

For the first packet, refer to the foregoing description of the IOAM packet. For example, the first packet may have the format shown in FIG. 2, or the first packet may not include the IOAM header in the format shown in FIG. 2, or may not include the IOAM header or the Hop-by-Hop Options header.

The current network node may be a head node on a forwarding path of a flow corresponding to the first packet, or may be a transit node on a forwarding path of a flow corresponding to the first packet. For example, the current network node may be an IOAM ingress node, and the first packet may not include an IOAM header. The current network node may also be an IOAM transit node, and the first packet may include an IOAM header.

In step S402, the current network node determines a flow identification corresponding to the first packet.

The first packet does not include the flow identification. The flow identification corresponds to a feature of the first packet. The feature of the first packet is located in a header of the first packet.

Optionally, the current network node may match the feature of the first packet with a traffic profile, to obtain the flow identification of the flow corresponding to the first packet. The flow identification corresponding to the first packet may also be considered as a flow identification corresponding to the feature of the first packet.

The traffic profile may record a correspondence between the feature of the first packet and the flow identification (Flow ID). The traffic profile may be used to perform simple traffic classification on a packet received by the current network node, or may be used to perform complex traffic classification on a packet received by the current network node. The feature of the first packet may be specifically a field of the header of the first packet. For example, the feature of the first packet may be a destination IP address in the IP header of the first packet, or the feature of the first packet may be a destination IP address and a source IP address in the IP header of the first packet. For example, the feature of the first packet may be a 5-tuple of the first packet. The 5-tuple may include a source IP address, a destination IP address, a source port, a destination port, and a protocol. The source IP address, the destination IP address, and the protocol are fields in the IP header of the first packet. The source port and the destination port may be fields in a TCP header or a UDP header of the first packet. In this application, a plurality of packets having a same feature are referred to as a flow. Having a same feature means that the plurality of packets have fields of a same type, and values of the fields of the same type in the plurality of packets are equal. The fields of the same type may include one field or a plurality of fields. An example in which a feature of a packet is a source IP address is used for description. When both a packet 1 and a packet 2 have a source IP address, and a source IP address of the packet 1 is equal to a source IP address of the packet 2, the packet 1 and the packet 2 belong to a same flow. An example in which features of a packet are a source IP address and a destination IP address is used for description. When both a packet 3 and a packet 4 have a source IP address and a destination IP address, a source IP address of the packet 3 is equal to a source IP address of the packet 4, and a destination IP address of the packet 3 is equal to a destination IP address of the packet 4, the packet 3 and the packet 4 belong to a same flow. It may be understood that traffic classification may be performed on the packet by using different granularities. For example, compared with performing traffic classification on a packet based on a source IP address, performing traffic classification on a packet based on a source IP address and a destination IP address is a fine-grained traffic classification manner. For another example, compared with performing traffic classification on a packet based on a 5-tuple, performing traffic classification on a packet based on a source IP address and a destination IP address is a coarse-grained traffic classification manner. In addition, it should be noted that a plurality of packets belonging to a same flow have a same feature, and a plurality of packets respectively belonging to different flows have different features. Further, the plurality of packets belonging to the same flow correspond to a same flow identification. The plurality of packets respectively belonging to different flows correspond to different flow identifications. For example, assuming that the packet 1 and the packet 2 belong to a same flow, the packet 1 corresponds to a flow identification 1, and the packet 2 corresponds to the flow identification 1. For another example, assuming that the packet 3 and the packet 4 respectively belong to different flows, the packet 3 corresponds to a flow identification 2, and the packet 4 corresponds to a flow identification 3.

The first packet includes the header of the first packet. The header of the first packet includes the feature of the first packet, that is, the header of the first packet includes the field of the feature of the first packet. For example, if the feature of the first packet includes the source IP address and/or the destination IP address, the header of the first packet includes the IP header, and the source IP address and the destination IP address of the first packet are located in the IP header of the first packet. If the feature of the first packet includes the source IP address and the source port number, the source IP address of the first packet is located in the IP header of the first packet, and the source port number of the first packet is located in the UDP/TCP header of the first packet, the header of the first packet includes the IP header and the UDP/TCP header. The header of the first packet may include one or more headers. The first packet may include an IOAM header. The header of the first packet does not include the IOAM header.

Optionally, a size of the flow identification is not limited in this application. The size of the flow identification may be greater than, equal to, or less than a size of the field in the header of the first packet. The size of the flow identification refers to a quantity of bits included in the flow identification. The field in the header of the first packet refers to a quantity of bits included in the field in the header of the first packet. For example, when the feature of the first packet is the destination IP address, a size of the feature of the first packet is 32 bits or 128 bits. A field that is corresponding to the flow identification and that is in the header of the first packet may be one or more fields in which the feature of the first packet that matches the traffic profile is located. The size of the flow identification is less than the size of the field in the header of the first packet, so that an octets-left used by a subsequent node to parse a packet for traffic classification can be reduced, and a delay can be reduced.

The flow identification may be used to identify a flow (or referred to as a service flow or a data flow) to which a packet belongs. The flow identification may be used by a network node to perform traffic classification on a packet, and the network node may be an IOAM node or a non-IOAM network node. The flow identification may be added to a traffic profile in a process of creating the traffic profile. The following provides detailed descriptions with reference to a specific embodiment. Details are not described herein.

In step S403, the current network node obtains a second packet based on the first packet and the flow identification.

For example, the current network node is an IOAM ingress node, and before step S403, the current network node may receive configuration information of an IOAM transit node and an IOAM egress node.

The second packet includes the flow identification and an IOAM header, and in the second packet, the flow identification is located before the IOAM header.

In some embodiments, the second packet may include the first packet. The current network node may insert a flow identification field into the first packet. For example, referring to the packet format shown in FIG. 2, the current network node may insert a Hop-by-Hop Options header into the first packet, and the flow identification is located in the Hop-by-Hop Options header. For another example, the current network node may insert an extension field into the Hop-by-Hop Options header of the first packet, and the flow identification is located in the extension field.

In some other embodiments, the second packet may include a part of the first packet. The current network node may change values of some fields in the first packet, that is, write the flow identification into the field. For example, referring to the packet format shown in FIG. 2, the current network node may change a reserved 1 field of the Hop-by-Hop Options header to the flow identification.

In the second packet, the flow identification may be located in an IP header or a specific header. The specific header may include the layer 2 header of the first packet, and may further include a field such as the layer 2.5 header of the first packet that is located before the IP header.

The current network node may obtain the second packet before writing the flow identification into the IOAM header of the first packet.

It may be understood that when the flow identification is written into the IP header of the first packet, the IP header included in the second packet is different from the IP header included in the first packet. For example, compared with the IP header of the first packet, a field used to carry a flow label is added to the IP header of the second packet.

The second packet may pass through the IOAM node, that is, there is an IOAM node on a forwarding path of the second packet.

The current network node may be an IOAM node. The current network node may write a sequence number of the first packet into an IOAM packet header of the current network node of the packet. The sequence number is determined based on the flow identification. The sequence number may be used to calculate a packet loss and/or a packet loss location. The IOAM packet header of the current network node is inserted into the packet by the current network node.

In some embodiments, the current network node may be an IOAM ingress node. The current network node may insert the IOAM header of the current network node into the first packet, that is, the current network node may add IOAM information by using an incremental mode. In other words, the current network node may add a field, so that the second packet includes the IOAM header of the current network node, and the added field includes the IOAM header of the current network node.

In some other embodiments, the current network node may be an IOAM transit node. The current network node may insert the IOAM header of the current network node into the first packet to obtain the second packet. For example, the second packet may include the first packet, and the current network node may insert the flow identification field and the IOAM header into the first packet. The current network node may also change some fields in the IOAM header of the first packet, and some changed fields in the second packet include the IOAM header of the current network node, that is, the current network node may add the IOAM information by using a pre-allocation mode. In other words, the current network node sets values of some fields in the IOAM header to the IOAM information of the current network node.

The current network node may obtain the sequence number of the first packet based on a traffic classification result. For example, the current network node may obtain, based on the flow identification, the sequence number corresponding to the first packet. The current network node may write the sequence number into the IOAM header of the current network node of the first packet or the second packet. The IOAM header of the current network node may be inserted into the first packet by the current network node. The IOAM header may further include one or more pieces of information such as a timestamp corresponding to the first packet, an ID of a current network node, and an interface ID. The IOAM header may be located after the IP header of the packet. To reduce a packet detection depth, the flow identification may be located in the specific header of the second packet, for example, may be located in a layer 2 header and a layer 2.5 header of the second packet, an IP header in a layer 3 header, or an extension header. The layer 3 header of the packet may include the IP header. The layer 2 header of the packet may be located before the layer 3 header. The layer 2.5 header of the packet may be located before the layer 3 header and after the layer 2 header of the packet. In some embodiments, the flow identification may be located in an MPLS header, and the MPLS header is located in the layer 2.5 header of the packet. In some embodiments, the flow identification may be located in the IP header of the second packet or an extension header of the IP header. For example, the second packet is an IPv6 packet, and the flow identification may be located in an extension header Hop-by-Hop Options header of the IP header of the second packet. In this manner, the current technology is not affected. The second packet includes the IOAM header, that is, the second packet is an IOAM packet, and the flow identification may be located before the IOAM header of the second packet.

In step S404, the current network node sends the second packet to a next network node.

After performing traffic classification on the first packet, the current network node writes the flow identification of the flow corresponding to the first packet into the first packet, to obtain the second packet. A subsequent IOAM node on a packet transmission path may process the packet based on the flow identification, so that a packet parsing depth is reduced, thereby reducing a transmission delay, and improving forwarding performance A subsequent node does not depend on a feature of a packet to generate a complex traffic profile, and performs complex packet matching and classification based on the traffic profile, thereby simplifying traffic classification in a subsequent network node.

The second packet is a flow identification packet that includes the flow identification. The second packet may include first type information, and the first type information may be used to determine that the second packet is the flow identification packet that carries the flow identification. The subsequent network node may determine, by using the first type information, that the second packet is the flow identification packet that carries the flow identification. The first type information may be located in the IP header of the second packet or a field before the IP header. For example, the first type information may be located in the layer 2 header or the layer 2.5 header of the packet. For example, the second packet is the IPv6 packet, and the first type information may be located in an option type field of the Hop-by-Hop Options header. The first type information may be written into the packet by the current network node. For example, the option type may be written into the first packet before or when the current network node writes the flow identification into the first packet, or a first option type may be written into the second packet by the current network node.

The current network node may process the packet.

For example, the packet processing method may include: obtaining configuration information corresponding to a flow. A manner of obtaining the configuration information corresponding to the flow may be: performing matching between a plurality of features of the first packet and the traffic profile to simultaneously obtain the flow identification and configuration information of the flow corresponding to the first packet, or obtaining the configuration information by using the flow identification after the feature of the first packet is matched with the traffic profile in step S402 to obtain the flow identification of the flow corresponding to the first packet.

In some embodiments, the configuration information may include a traffic behavior corresponding to the flow. The packet processing method may further include: controlling the second packet to perform the traffic behavior.

In some embodiments, when the current network node forwards a packet in an equal-cost multipath (ECMP) mode, or a port sending a packet is a TRUNK interface, a feature of the packet may be obtained in a hash mode. The configuration information may include egress information used to send the packet. The packet processing method may further include: sending the second packet through an egress indicated by the egress information.

For example, the packet processing method may further include: performing statistics collection based on the flow identification. The current network node is the IOAM node. Based on the flow identification, the current network node may collect statistics on different flows, and a statistical value corresponds to a sequence number corresponding to a packet of the flow in the current network node. The current network node may obtain the sequence number of the packet based on the flow identification, and insert the IOAM header into the packet. The IOAM header may include the sequence number. The sequence number is used to calculate a packet loss and/or a packet loss location.

The second packet may include a plurality of flow identifications. Based on the plurality of flow identifications, the network node may perform different processing on the packet.

Figure 5:
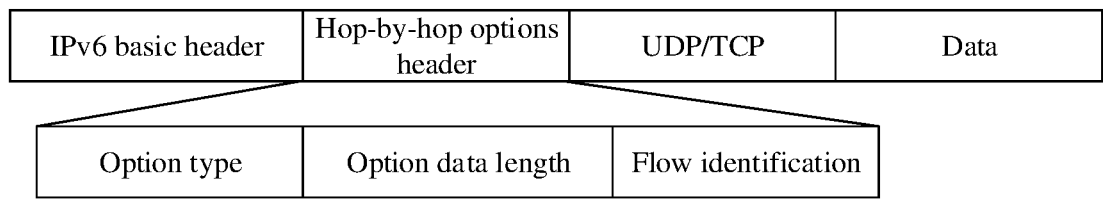
FIG. 5 is a schematic diagram of an internet protocol version 6 packet format according to an embodiment of this application.

FIG. 5 is a format of a second packet according to an embodiment of this application. The packet is an IPv6 packet. The packet may include: an IPv6 basic header, an IPv6 extension header Hop-by-Hop Options header, a user datagram protocol (UDP)/transmission control protocol (TCP) field, and a data field. The Hop-by-Hop Options header may include an option type and a flow identification. The option type may include a first type information. The first type information may be used to determine that the second packet is a flow identification packet that carries the flow identification. The Hop-by-Hop Options header may further include an option data length (Opt Data Len).

The flow identification may use a low-order 16 bits of a default field (the default field may also be referred to as a reserved field) in the Hop-by-Hop Options header, and the flow identification may also use an extension field in the Hop-by-Hop Options header, for example, 32 bits extended from the Hop-by-Hop Options header, to write into the flow identification. That is, the flow identification may be located in a reserved 1 field or an extension field of the Hop-by-Hop Options header in FIG. 2. In the foregoing solution, a location of the flow identification has little impact on a current packet transmission technology. A definition of a flow identification field may be added to the Hop-by-Hop Options header.

The second packet may include a plurality of flow identifications. The plurality of flow identifications may be written by a same network node, or may be written by different network nodes. The plurality of flow identifications may be obtained by matching different packet features. In other words, the plurality of flow identifications may correspond to a plurality of traffic classification manners. For example, the second packet may include a flow identification obtained based on a 5-tuple, a flow identification obtained based on a 2-tuple, and the like. The plurality of flow identifications are written into an IOAM packet based on the plurality of traffic classification manners. A packet detection depth of a subsequent network node may be reduced if flow identifications are written by a network node, and a system resource may be properly configured if flow identifications are written by a plurality of network nodes.

The second packet may include second type information, and the second type information is used to identify a traffic classification manner corresponding to the flow identification. For example, the second type information may be used to indicate that the flow identification is determined based on a 5-tuple. The second type information and the flow identification may be located in a same packet header. For example, if the flow identification is located in an extension header Hop-by-Hop Options header of an IP packet header of the second packet, the second type information may be located in the extension header Hop-by-Hop Options header. If the second packet may include a plurality of flow identifications, the second type information may be used to indicate a traffic classification manner corresponding to each of the plurality of flow identifications. For example, the second type information may be used to indicate that a first flow identification is obtained based on the 5-tuple, and a second flow identification is obtained based on a 3-tuple. The second type information may be located before the flow identification.

Figure 6:
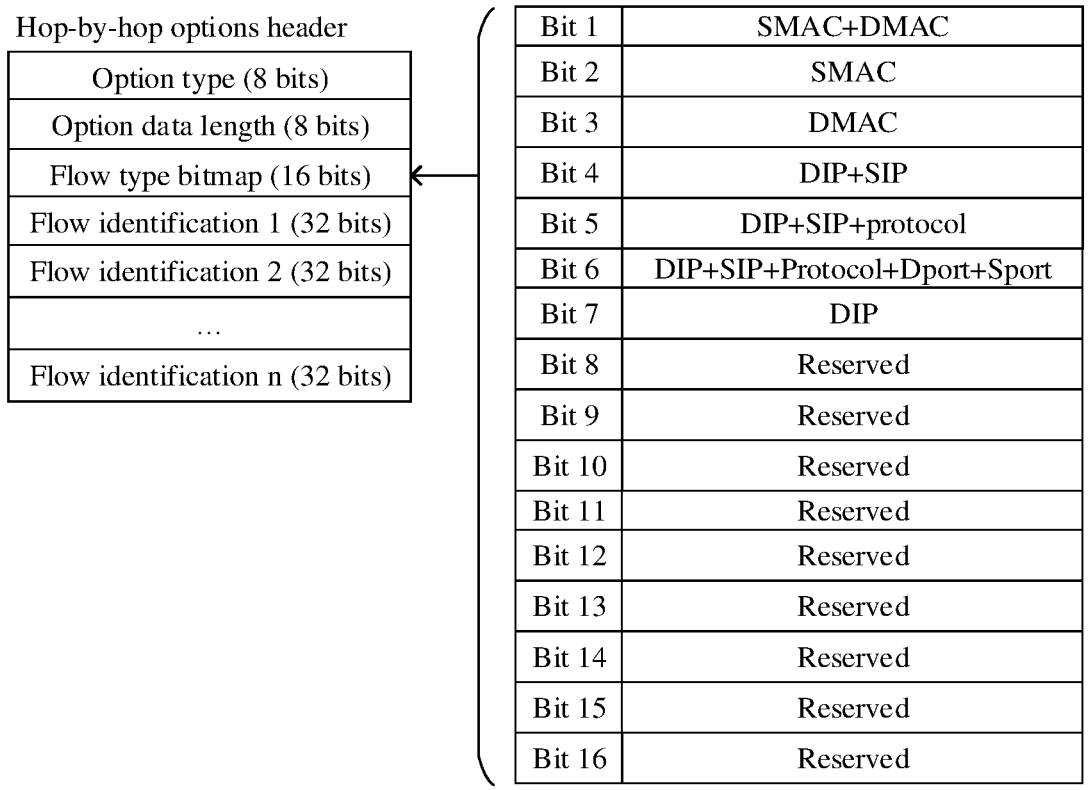
FIG. 6 is a schematic diagram of a hop-by-hop options header format according to an embodiment of this application.

FIG. 6 is a format of a Hop-by-Hop Options header according to an embodiment of this application. A Hop-by-Hop Options header field of a packet may include: an option type, an option data length, a flow type bitmap a plurality of flow identifications, and the like. The flow type bitmap may include second type information. The flow type bitmap may include 16 bits. Each bit of the flow type bitmap may be represented by "1" or "0" to indicate whether the Hop-by-Hop Options header has a flow identification corresponding to a traffic classification manner. The traffic classification manner corresponding to each bit of the flow type bitmap may be: bit 1: SMAC, and DMAC; bit 2: SMAC; bit 3: DMAC; bit 4: destination IP address (DIP), and source IP address (SIP); bit 5: DIP, SIP, and protocol; bit 6: DIP, SIP, protocol, destination port (Dport), and source port (Sport); and bit 7: DIP. The last eight bits of the flow type bitmap may be reserved.

To quickly obtain a traffic behavior corresponding to the packet, a traffic profile may be stored in a ternary content addressable memory (TCAM). After performing traffic classification on a first packet, a current network node writes a flow identification of a flow corresponding to the first packet into the first packet, to obtain a second packet. A subsequent IOAM node on a packet transmission path may process the packet based on the flow identification, and does not need to perform matching by using an ACL. Therefore, the subsequent IOAM node may perform a corresponding traffic behavior on the packet without depending on a TCAM resource, thereby reducing costs and power consumption.

Figure 7:
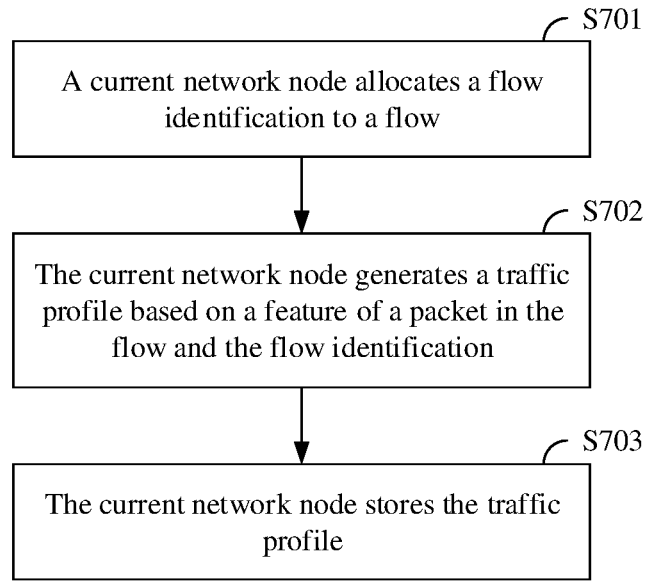
FIG. 7 is a schematic flowchart of creation of a traffic profile according to an embodiment of this application.

The traffic profile may be created before the current network node receives the packet. FIG. 7 is a method for creating a traffic profile according to an embodiment of this application. The method in FIG. 7 includes step S701 to step S703.

In step S701, a current network node may allocate a flow identification to a flow.

The flow identification may be used to identify a flow (or referred to as a service flow) to which a packet belongs. The flow identification may be used to identify a unique flow. The current network node may allocate flow identifications to different flows according to a pre-agreed or preset rule. The pre-agreed or preset rule may be one or more features of the packet, for example, may be a 5-tuple, a 3-tuple, or layer 2 information of the packet.

In step S702, the current network node may generate a traffic profile based on a feature of a packet in each flow and the flow identification.

The current network node generates the traffic profile, and the traffic profile may be used to indicate a correspondence between the feature of the packet and the flow identification.

In step S703, the current network node may store the traffic profile.

To improve a search speed, the current network node may store the traffic profile in a TCAM.

Figure 8:
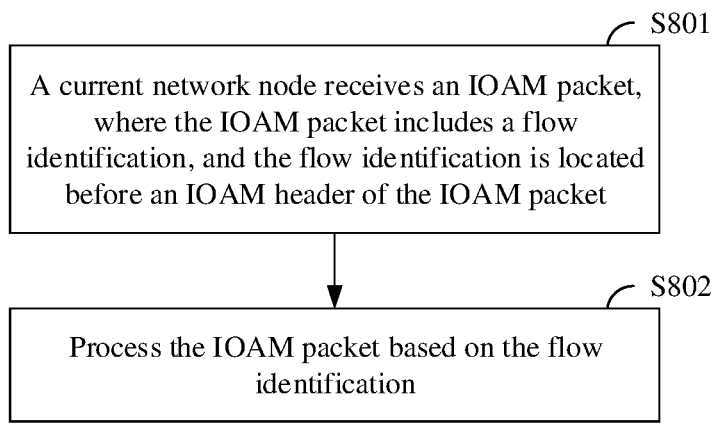
FIG. 8 is a schematic flowchart of a packet processing method according to another embodiment of this application.

FIG. 8 is a schematic flowchart of a packet processing method according to an embodiment of this application. The method in FIG. 8 includes step S801 to step S802.

In step S801, a current network node receives an IOAM packet, where the IOAM packet includes a flow identification, and the flow identification is located before an IOAM header of the IOAM packet.

The flow identification corresponds to a feature of the IOAM packet, and the feature of the IOAM packet is located in a header of the IOAM packet. The header of the IOAM packet is not the same as the IOAM header, that is, the IOAM header is not located in a header field of the IOAM packet.

The IOAM packet includes the header of the IOAM packet. The header of the IOAM packet includes the feature of the IOAM packet, that is, the header of the IOAM packet includes a field of the feature of the IOAM packet. For example, if the feature of the IOAM packet includes a source IP address, the header of the IOAM packet includes an IP header, and the source IP address of the IOAM packet is located in an IP header of a first packet. If the feature of the IOAM packet includes the source IP address and a source port number, the source IP address of the IOAM packet is located in the IP header of the IOAM packet, and the source port number of the IOAM packet is located in a UDP/TCP header of the first packet, the header of the IOAM packet includes the IP header and the UDP/TCP header. The header of the first packet may include one or more headers. The head of the IOAM packet does not include the IOAM header.

For the IOAM packet, refer to the second packet mentioned in FIG. 4, and for a format of the IOAM packet, refer to FIG. 2.

The current network node may be a transit node on a transmission path of the IOAM packet, or may be a tail node. For example, the current network node may be an IOAM transit node, or an IOAM egress node.

The current network node may search for and obtain the flow identification in the IOAM packet. Optionally, the IOAM packet may include first type information. The first type information may be used to indicate that the IOAM packet includes the flow identification. The current network node may search for and obtain the flow identification in a flow identification packet after determining, by using the first type information in the IOAM packet, that the IOAM packet is the flow identification packet.

The flow identification may be used to identify a flow (or referred to as a service flow) to which a packet belongs. The IOAM packet includes the IOAM header, and the flow identification may be located before the IOAM header. The flow identification may be located in a layer 2 header and a layer 2.5 header of the IOAM packet, or an IP header in a layer 3 header. The layer 3 header of the packet may include the IP header. The layer 2 header of the packet may be located before the layer 3 header. The layer 2.5 header of the packet may be located before the layer 3 header and after the layer 2 header of the packet. In some embodiments, the flow identification may be located in a multi-protocol label switch (MPLS) header, and the MPLS header is located in the layer 2.5 header of the packet. In some embodiments, the flow identification may be located in the IP header. The flow identification may be located in an extension header of the IP header of the IOAM packet. For example, the IOAM packet is an IPv6 packet, and the flow identification may be located in an extension header Hop-by-Hop Options header after the IP header of the IOAM packet. Referring to the packet format in FIG. 2, the flow identification may be located in an extension field of the Hop-by-Hop Options header, and may alternatively be located in a reserved 1 field.

Optionally, a size of the flow identification is not limited in this application. The flow identification may be obtained by matching the feature of the IOAM packet with the traffic profile. The traffic profile may record a correspondence between a feature of the first packet and the flow identification. The field in the header of the IOAM packet may include the feature of the IOAM packet. The size of the flow identification may be greater than, equal to, or less than a size of the field in the header of the IOAM packet. The size of the flow identification refers to a quantity of bits included in the flow identification. The field in the header of the IOAM packet may refer to a quantity of bits included in the field in the header of the IOAM packet. For example, when the feature of the IOAM packet is a destination IP address, a size of the feature of the IOAM packet is 32 bits or 128 bits. A field that is corresponding to the flow identification and that is in the header of the IOAM packet may be one or more fields in which the feature of the IOAM packet that matches the traffic profile is located. The size of the flow identification is less than the size of the field in the header of the IOAM packet, so that an octets-left used by a subsequent node to parse the IOAM packet for traffic classification can be reduced, and a delay can be reduced.

Optionally, the IOAM packet may include a plurality of flow identifications. The plurality of flow identifications may be written by a same network node, or may be written by different network nodes. The plurality of flow identifications may be obtained by matching different packet features. In other words, the plurality of flow identifications may correspond to a plurality of traffic classification manners. For example, the IOAM packet may include a flow identification obtained based on a 5-tuple, a flow identification obtained based on a 7-tuple, and the like.

The IOAM packet may include second type information, and the second type information is used to identify a traffic classification manner corresponding to the flow identification. For example, the second type information may be used to indicate that the flow identification is determined based on the 5-tuple. The second type information and the flow identification may be located in a same packet header. For example, if the IOAM packet is an IPv6 packet, and the flow identification is located in an extension header Hop-by-Hop Options header of an IP packet header of the IOAM packet, the second type information may be located in the extension header Hop-by-Hop Options header. If the IOAM packet may include a plurality of flow identifications, the second type information may be used to indicate a traffic classification manner corresponding to each of the plurality of flow identifications. For example, the second type information may be used to indicate that a first flow identification is obtained based on the 5-tuple, and a second flow identification is obtained based on a 3-tuple. For the Hop-by-Hop Options header of the IOAM packet, reference may be made to the format of the Hop-by-Hop Options header in FIG. 6.

In step S802, the current network node processes the IOAM packet based on the flow identification.

For example, step S802 may include: searching a traffic classification table based on the flow identification, to obtain a traffic behavior; and processing the IOAM packet based on the traffic behavior.

The traffic classification table may be a linear table. The traffic classification table may record the flow identification and the traffic behavior. The traffic classification table may record a correspondence between the flow identification and the traffic behavior. The correspondence may be that one flow identification corresponds to one traffic behavior, or may be that one flow identification corresponds to a plurality of traffic behaviors.

The traffic classification table may be stored in a memory such as a TCAM, a CAM, or a RAM. The TCAM has advantages of a fast speed and easy implementation, but the TCAM is relatively expensive, a capacity of a storage chip is relatively small, and by using a parallel matching comparison manner, power consumption of the TCAM is relatively high. For example, the traffic classification table may be stored in the RAM, the flow identification may be used as an address of the traffic classification table, and by using the flow identification, quick search may be performed through address index, to determine the traffic behavior. This saves network hardware TCAM resources, reduces power consumption, and reduces costs.

For example, step S802 may include: collecting statistics on flow identifications. The current network node is an IOAM node. Based on the flow identification, the current network node may collect statistics on different flows, and a statistical value corresponds to a sequence number corresponding to a packet of the flow in the current network node. The current network node may obtain the sequence number of the packet based on the flow identification, and insert the IOAM header into the packet. The IOAM header includes the sequence number. The sequence number is used to calculate a packet loss and/or a packet loss location. For example, when a port that is on the current network node and that sends the packet is a TRUNK interface, step S802 may include: determining, based on the flow identification, an egress for sending the packet; and sending the packet based on the egress.

The IOAM packet may include a plurality of flow identifications. Based on the plurality of flow identifications, the network node may perform different processing on the packet.

For example, the IOAM packet includes a first flow identification and a second flow identification. The first flow identification may be obtained by classifying packets based on the 5-tuple, and the second flow identification may be obtained by classifying packets based on a 2-tuple. The current network node may collect statistics based on the first flow identification, obtain a sequence number corresponding to the packet, and insert the IOAM header, where the IOAM header includes the sequence number. The port that is on the current network node and that sends the packet is the TRUNK interface. The current network node determines, based on the second flow identification, the egress for sending the packet, and sends the packet through the egress.

Figure 9:
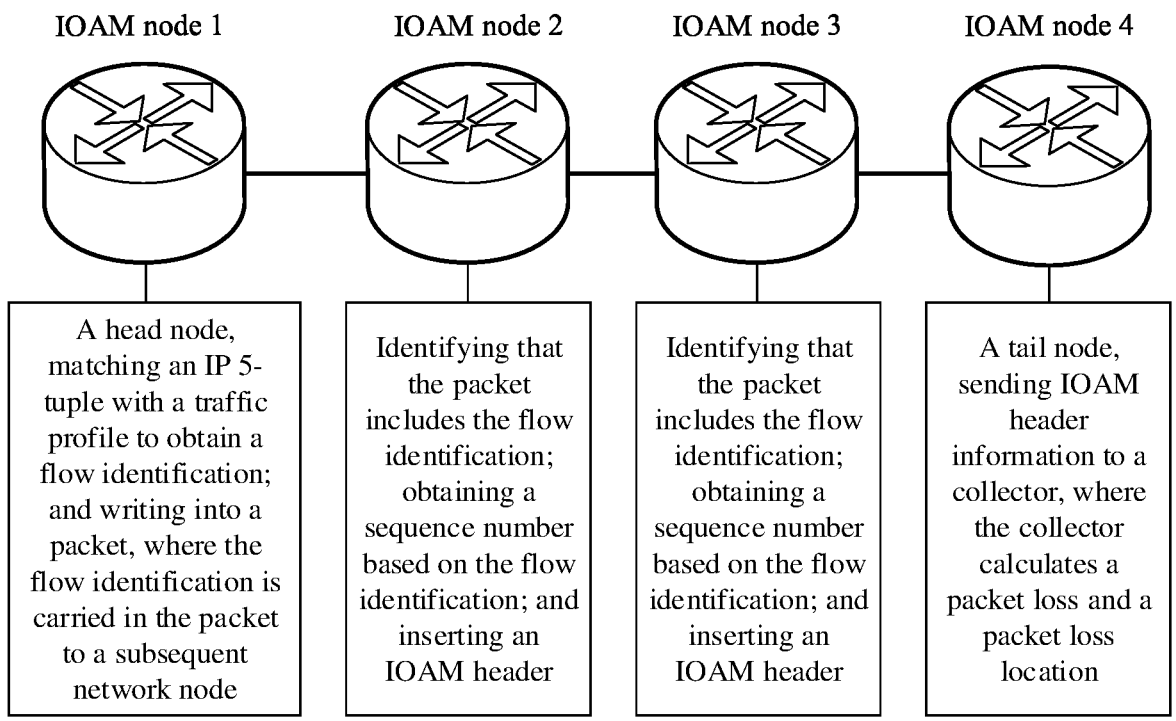
FIG. 9 is a schematic diagram of a traffic classification process of a network node according to an embodiment of this application.

FIG. 9 is a schematic flowchart of a packet processing method of a network node on a packet transmission path according to an embodiment of this application.

Node 1 is an IOAM ingress node, and matches an IP 5-tuple of a packet with a traffic profile, to obtain a flow identification. The flow identification is carried in the packet to a subsequent network node. Node 2 and node 3 are another two IOAM transit nodes on the transmission path. Node 4 is an IOAM egress node. A method for processing a packet by four network nodes is described by using an IPv6 packet as an example.

The node 1 performs traffic classification on the packet. The node 1 inserts the flow identification into a Hop-by-Hop Options header of the packet of a specified service flow based on a traffic classification result. The node 1 may obtain a sequence number of the packet based on the flow identification. The sequence number may be used by an analyzer to calculate a packet loss, and may be used by the analyzer to calculate a packet loss location. The node 1 collects statistics on the service flow based on the flow identification, and a statistical value corresponds to the sequence number of the packet in the node 1. The node 1 inserts an IOAM header 1 into the packet, and inserts the flow identification into the Hop-by-Hop Options header. The IOAM header 1 may include information such as a timestamp, a node ID of the node 1, an interface ID, and the sequence number of the packet.

The node 2 and the node 3 may determine, based on an option type of the Hop-by-Hop Options header, that a received packet is an IOAM packet and carries the flow identification. The node 2 and the node 3 may collect statistics based on the flow identification of the packet, that is, obtain the sequence number of the packet based on the flow identification. The node 2 and the node 3 may respectively insert an IOAM header 2 and an IOAM header 3 into the packet. An IOAM header includes information such as a timestamp, a node ID, an interface ID, and a sequence number.

The node 4 may determine, based on the option type of the Hop-by-Hop Options header, that a received packet is the IOAM packet and carries the flow identification. The node 4 may collect statistics based on the flow identification of the packet, that is, obtain the sequence number of the packet based on the flow identification. The node 4 may decapsulate the packet, and report collected data of the nodes 1 to 3 to the analyzer. The collected data may include data in the IOAM header of the nodes 1 to 3 in the packet. The collected data may be in a preset periodicity. The node 4 may further send information such as a timestamp, a node ID, an interface ID, and a sequence number that correspond to the node 4 to the analyzer.

The analyzer analyzes packets in a statistical periodicity to determine the packet loss and the packet loss location, and compares a sequence number of a sent packet with a sequence number of a receive end. A difference between the two sequence numbers is a quantity of lost packets. A specific packet loss location may be calculated based on a sequence number of each node.

Figure 10:
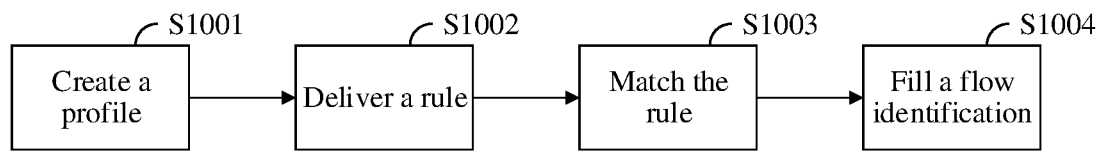
FIG. 10 is a schematic diagram of a packet processing process according to an embodiment of this application.

FIG. 10 shows how node 1 processes a packet. A method shown in FIG. 10 includes the following steps: create a profile (S1001), deliver a rule (S1002), match the rule (S1003), and fill a flow identification (S1004).

In step S1001, the node 1 may allocate the flow identification to a specific flow, and the traffic profile may be used to record a correspondence between a flow feature and the flow identification. The traffic profile may be used to perform complex traffic classification on the packet based on an IP 5-tuple of the packet.

In step S1002, the node 1 may deliver and store the traffic profile in a TCAM.

In step S1003, when the packet enters an interface of the node 1, the node 1 may perform matching on the packet according to a rule, for example, the IP 5-tuple, determined by the traffic profile in the TCAM.

In step S1004, if the matching succeeds, the node 1 may fill a result, namely, the flow identification, returned by the matching, into the packet, and write first type information at the same time. The first type information may be used to indicate that the packet includes the flow identification.

Figure 11:
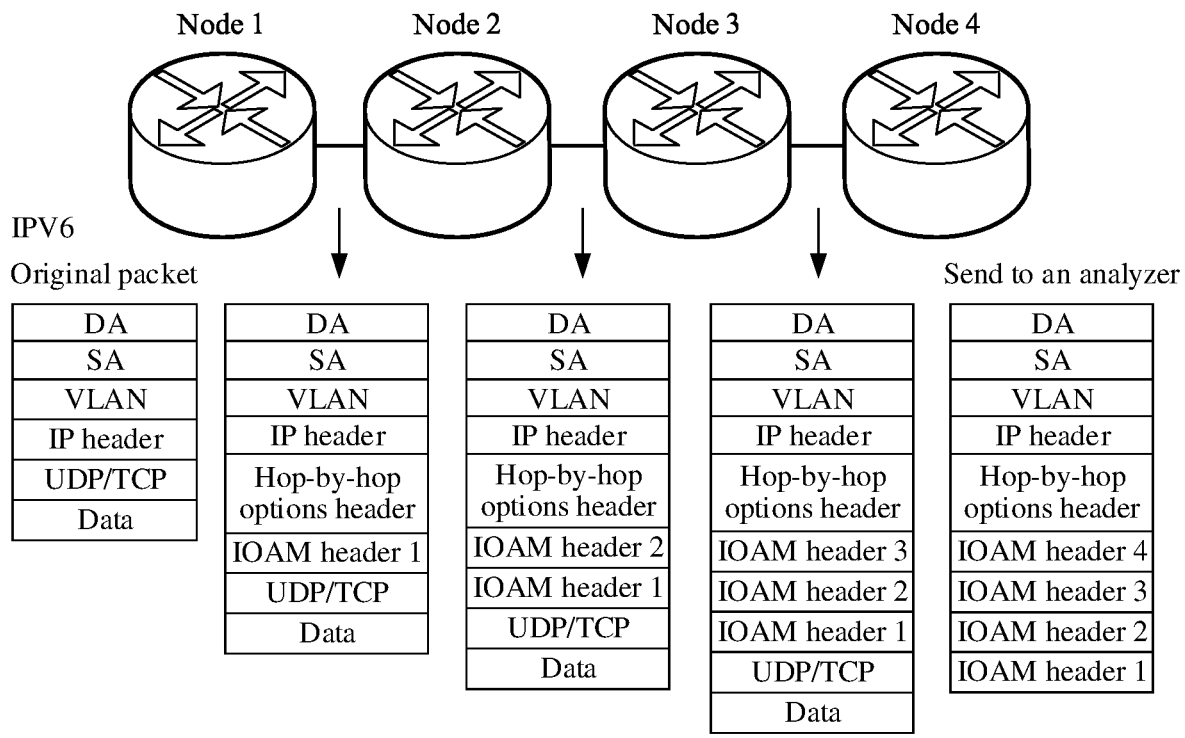
FIG. 11 is a schematic diagram of a packet format according to an embodiment of this application.

Taking an IPv6 packet as an example, the node 1 writes the flow identification into the Hop-by-Hop Options header of the packet. A field is read and processed by each node on a packet transmission path. FIG. 11 is a packet format when a packet enters each network node.

Figure 12:
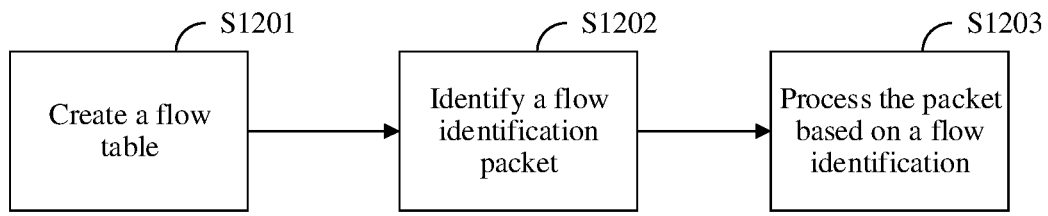
FIG. 12 is a schematic diagram of a packet processing process based on a flow identification according to an embodiment of this application.

FIG. 12 is a schematic flowchart of a packet processing method of node 2 and node 3. The method in FIG. 12 includes the following steps: create a flow table (S1201), identify a flow identification packet (S1202), and process the packet based on the flow identification (S1203).

Step S1201: Create the flow table based on the flow identification, where the flow table is a linear table. The flow table may be used to record a correspondence between the flow identification and a traffic behavior. The flow table may be the linear table.

Step S1202: Obtain a packet, and identify that the packet is a flow identification packet, that is, identify that the packet is a packet including the flow identification. The packet may include first type information, and the first type information may be used to indicate that the packet includes the flow identification. The packet may include second type information, and the second type information may be used to indicate a traffic classification manner corresponding to the flow identification. For example, the second type information may be used to indicate that the flow identification is determined based on a 5-tuple. The second type information and the flow identification may be located in a same packet header. For example, if the flow identification is located in an extension header Hop-by-Hop Options header of an IP packet header of a second packet, the second type information may be located in the extension header Hop-by-Hop Options header. If the packet may include a plurality of flow identifications, the second type information may be used to indicate a traffic classification manner corresponding to each of the plurality of flow identifications. For example, the second type information may be used to indicate that a first flow identification is obtained based on the 5-tuple, and a second flow identification is obtained based on a 3-tuple.

Step S1203: Process the packet based on the flow identification.

On a packet transmission path, a head network node fills the flow identification into the packet, and a subsequent network node processes the packet based on the flow identification without depending on a complex matching process. This reduces a waste of system resources, reduces in-depth detection on the packet, and improves forwarding performance.

The foregoing describes the method embodiments of the embodiments of this application with reference to FIG. 1 to FIG. 12. The following describes apparatus embodiments of the embodiments of this application with reference to FIG. 13 to FIG. 15. It should be understood that descriptions of the method embodiments correspond to descriptions of the apparatus embodiments. Therefore, for a part that is not described in detail, refer to the foregoing method embodiments.

Figure 13:
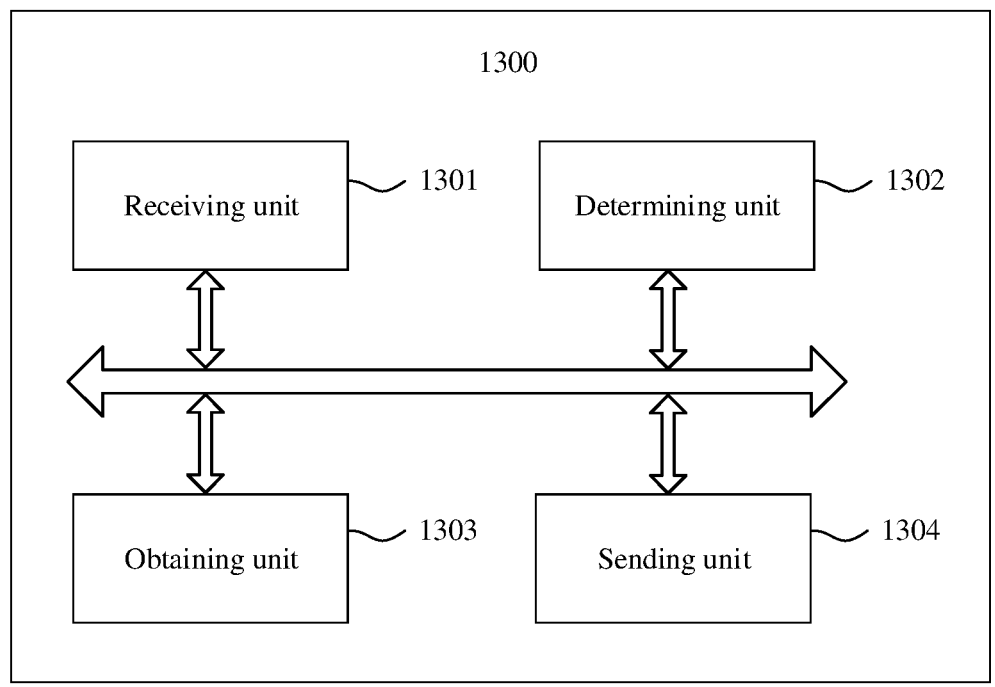
FIG. 13 is a schematic structural diagram of a packet processing network device according to an embodiment of this application.

FIG. 13 is a packet processing network device 1300 according to an embodiment of this application, including a receiving unit 1301, a determining unit 1302, an obtaining unit 1303, and a sending unit 1304.

The receiving unit 1301 is configured to receive a first packet by a current network node.

The determining unit 1302 is configured to determine a flow identification corresponding to the first packet. The first packet does not include the flow identification, a feature of the first packet corresponds to the flow identification, or the feature of the first packet is located in a header of the first packet.

The obtaining unit 1303 is configured to obtain, based on the first packet and the flow identification, a second packet. The second packet includes the flow identification and an IOAM header, and in the second packet, the flow identification is located before the IOAM header.

The sending unit 1304 is configured to send the second packet to a next network node.

Optionally, when the IP header is an internet protocol version 6 (IPv6) header, the flow identification is located in a Hop-by-Hop Options header of the IPv6 header.

Optionally, the flow identification corresponds to a field in the header of the first packet, and a size of the flow identification is less than a size of the field in the header of the first packet.

Figure 14:
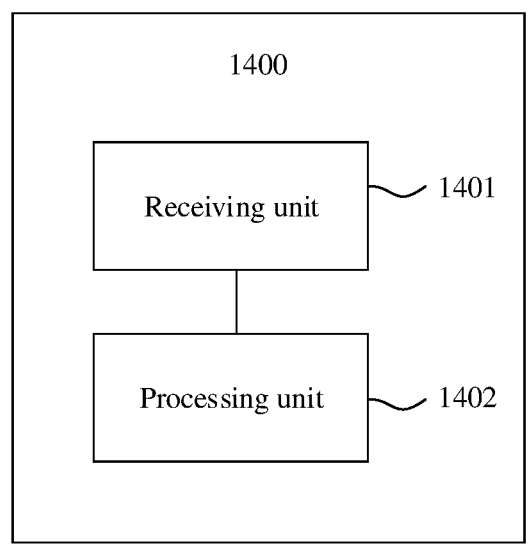
FIG. 14 is a schematic structural diagram of another packet processing network device according to an embodiment of this application.

FIG. 14 is a packet processing network device 1400 according to an embodiment of this application, including a receiving unit 1401, and a processing unit 1402.

The receiving unit 1401 is configured to receive an inband operations, administration and maintenance (IOAM) packet. The IOAM packet includes a flow identification, the flow identification is located before an IOAM header, the flow identification corresponds to a feature of the IOAM packet, the feature of the IOAM packet is located in a header of the IOAM packet, and the header of the IOAM packet and the IOAM header are not a same header.

The processing unit 1402 is configured to process, based on the flow identification, the IOAM packet.

Optionally, when the IP header is an internet protocol version 6 (IPv6) header, the flow identification is located in a Hop-by-Hop Options header of the IPv6 header.

Optionally, in a possible implementation, the flow identification corresponds to a field in the header of the IOAM packet, and a size of the flow identification is less than a size of the field in the header of the IOAM packet.

Optionally, the processing unit 1402 is further configured to search, based on the flow identification, a traffic classification table to obtain a traffic behavior. The traffic classification table is a linear table, and the linear table records the flow identification and the traffic behavior. The processing unit 1402 is further configured to process, based on the traffic behavior, the IOAM packet.

Optionally, the traffic classification table is stored in a random access memory RAM.

Figure 15:
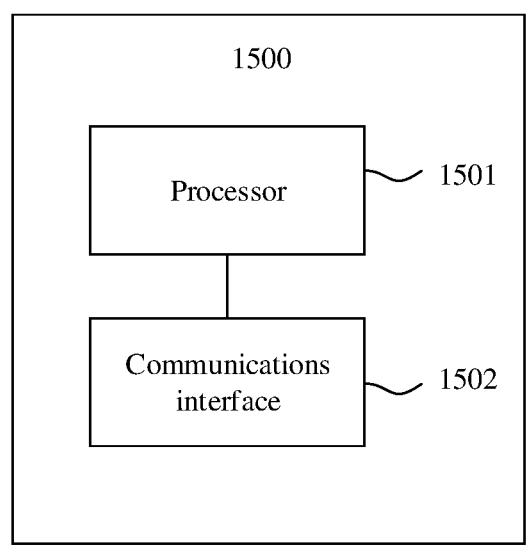
FIG. 15 is a schematic structural diagram of a communications apparatus according to an embodiment of this application.

FIG. 15 is a schematic structural diagram of a communications apparatus according to an embodiment of this application. The communications apparatus 1500 shown in FIG. 15 may correspond to the user equipment or the network device described above. The communications apparatus 1500 may include at least one processor 1501 and a communications interface 1502. The communications interface 1502 may be used by the communications apparatus 1500 to exchange information with another communications apparatus, and when program instructions are executed by the at least one processor 1501, the communications apparatus 1500 is enabled to implement the foregoing steps, methods, operations, or functions performed by the network device.

According to an embodiment of this application, a communications system is further provided, including one or more of the foregoing network devices.

According to an embodiment of this application, a computer program storage medium is further provided. The computer program storage medium has program instructions, and when the program instructions are executed, the foregoing method is performed.

According to an embodiment of this application, a chip system is further provided. The chip system includes at least one processor, and when program instructions are executed by the at least one processor, the foregoing method is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following" and a similar expression thereof refers to any combination of these items, including any combination of one item or a plurality of items. For example, at least one of a, b, and c may indicate: a, b, c, a and b, a and c, b and c, or a, b, and c, where a, b, and c may be singular or plural. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a first network node, the method comprising:
receiving a first packet;
determining a flow identification corresponding to the first packet, where the first packet does not comprise the flow identification, a feature of the first packet corresponds to the flow identification, and the feature of the first packet is located in a header of the first packet;
obtaining, based on the first packet and the flow identification, a second packet, wherein the second packet is an internet protocol version 6 (IPv6) packet, the second packet comprises (i) a field comprising the flow identification and (ii) an inband operations, administration and maintenance (IOAM) header, and the field comprising the flow identification is located in a hop-by-hop options header of the second packet before the IOAM header of the second packet; and sending the second packet to a second network node.

2. The method according to claim 1, wherein the field comprising the flow identification corresponds to a field in the header of the first packet, and a size of the field comprising the flow identification is less than a size of the field in the header of the first packet.

3. The method according to claim 1, wherein the feature of the first packet is a destination IP address and a source IP address.

4. The method according to claim 1, wherein the feature of the first packet includes a source IP address, a destination IP address and a protocol number.

5. The method according to claim 1, wherein the feature of the first packet includes a source IP address, a destination IP address, a source port, and a destination port.

6. A network device, comprising a processor and a communication interface, where:
the communication interface is configured to receive a first packet;
the processor is configured to:
 determine a flow identification corresponding to the first packet, wherein the first packet does not comprise the flow identification, a feature of the first packet corresponds to the flow identification, and the feature of the first packet is located in a header of the first packet;
 obtain, based on the first packet and the flow identification, a second packet, wherein the second packet is an internet protocol version 6 (IPv6) packet, the second packet comprises (i) a field comprising the flow identification and (ii) an inband operations, administration and maintenance (IOAM) header, and the field comprising the flow identification is located in a hop-by-hop options header of the second packet before the IOAM header of the second packet; and
the communication interface is further configured to send the second packet to a network node.

7. The network device according to claim 6, where the field comprising the flow identification corresponds to a field in the header of the first packet, and a size of the field comprising the flow identification is less than a size of the field in the header of the first packet.

8. The network device according to claim 6, wherein the feature of the first packet is a destination IP address and a source IP address.

9. The network device according to claim 6, wherein the feature of the first packet includes a source IP address, a destination IP address and a protocol number.

10. The network device according to claim 6, wherein the feature of the first packet includes a source IP address, a destination IP address, a source port, and a destination port.

11. A non-transitory computer readable storage medium, wherein the non-transitory computer readable storage medium has program instructions, and when the program instructions are executed by a computer, the computer is configured to perform steps comprising:
receiving a first packet;
determining a flow identification corresponding to the first packet, wherein the first packet does not comprise the flow identification, a feature of the first packet corresponds to the flow identification, and the feature of the first packet is located in a header of the first packet;
obtaining, based on the first packet and the flow identification, a second packet, wherein the second packet is an internet protocol version 6 (IPv6) packet, the second packet comprises (i) a field comprising the flow identification and (ii) an inband operations, administration and maintenance (IOAM) header, and the field comprising the flow identification is located in a hop-by-hop options header of the second packet before the IOAM header of the second packet; and
sending the second packet to a network node.

12. The non-transitory computer readable storage medium according to claim 11, wherein field comprising the flow identification corresponds to a field in the header of the first packet, and a size of the field comprising the flow identification is less than a size of the field in the header of the first packet.

13. A system comprises a first network device and a second network device, where:
the first network device is configured to:
 receive a first packet;
 determine a flow identification corresponding to the first packet, wherein the first packet does not comprise the flow identification, a feature of the first packet corresponds to the flow identification, and the feature of the first packet is located in a header of the first packet;
 obtain, based on the first packet and the flow identification, a second packet, wherein the second packet is an internet protocol version 6 (IPv6) packet, the second packet comprises (i) a field comprising the flow identification and (ii) an inband operations, administration and maintenance (IOAM) header, and the field comprising the flow identification is located in a hop-by-hop options header of the second packet before the IOAM header of the second packet; and
 send the second packet to the second network device.

14. The system according to claim 13, wherein the field comprising the flow identification corresponds to a field in a header of the first packet, and a size of the field comprising the flow identification is less than a size of the field in the header of the first packet.

* * * * *